Figure 1:
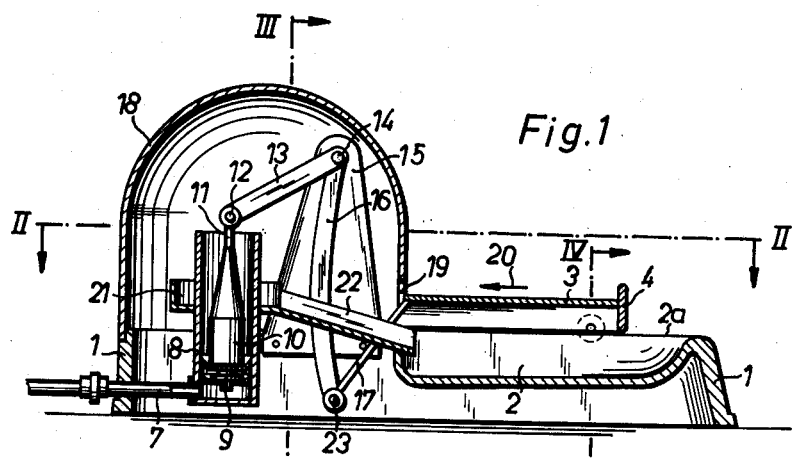

Feb. 5, 1963  G. NIEMÖLLER  3,076,434
ANIMAL ACTUATED WATERING PUMP
Filed April 4, 1960

INVENTOR:
GERHARD NIEMÖLLER
By
Richardson, David and Nardon
Att'ys.

United States Patent Office 3,076,434
Patented Feb. 5, 1963

3,076,434
ANIMAL ACTUATED WATERING PUMP
Gerhard Niemöller, Ratekau, Lubeck, Germany
Filed Apr. 4, 1960, Ser. No. 19,584
2 Claims. (Cl. 119—75)

The present invention relates to transportable animal-actuated watering pumps of the kind comprising an elongated watering trough, above which there is provided a plate member which may be pushed by an animal to actuate a pump through the intermediary of an operating member, to discharge water into the trough advantageously the pump is double-acting.

In a known watering pump of the kind referred to above, an elongated watering trough forms, at one end, the base of an upwardly extending pump housing, on the upper end of which the pump handle or other operating-member is rockably mounted at the side of the trough, the lower end of said pump handle being provided with a butt plate for the cattle: the construction is such that the butt plate blocks access to the trough, so that the animals can only start drinking at the free end of the trough and in so doing press the butt plate forwards, the pump handle being swivelled. By this means, water is fed from the pump into the trough. However, this good practical solution entails the disadvantage that cattle can easily lock their horns behind the pump handle or behind other parts, so that the pump housing must be made relatively high because the ratio of the length of the pump handle to its lever arm which is joined to the pump must be as large as possible in order that the force which the cattle must exert with their muzzzle in order to actuate the handle and the pump, be kept as small as possible. Therefore, owing to its height, the pump can relatively easily be knocked down by cattle or even caught and pulled down by their horns.

In order to prevent cattle from hooking their horns behind parts of the pump and in order to reduce as far as possible the danger of knocking the pump down, the invention consists in that a butt plate is provided at the free end of the plate member, which is in the form of a cap covering the trough, the arrangement being such that on a forward movement of the butt plate, said cap swings substantially horizontally into a hood to uncover the trough, the pump and its operating member being mounted beneath said hood.

By this means the whole pump, including most of the trough, is completely covered by a smooth wall, by means of the hood and the cap, and therefore cattle can no locker lock their horns behind parts of the pump. Advantageously the cap covering the trough is connected to the pump operating member at as low a position as possible by its end which is remote from the butt plate, a pivot shaft for said pump operating member being rigidly connected thereto, and being mounted beneath the hood above both the plane of the cap and also the pump, the actuating rod of which is pivotally connected to a lever which is rigidly connected to said pivot shaft. By this means the pressure point of the pump operating member may be located very far downwardly to a position situated in the immediate vicinity of the ground or of the lower edge of the pump base and at the same time, the operating member is situated at a very low position without any reduction of the lever arm ratio by comparison with known arrangements, that is to say: the height of construction is reduced and therefore the stability of the pump is enhanced.

Figure 2:
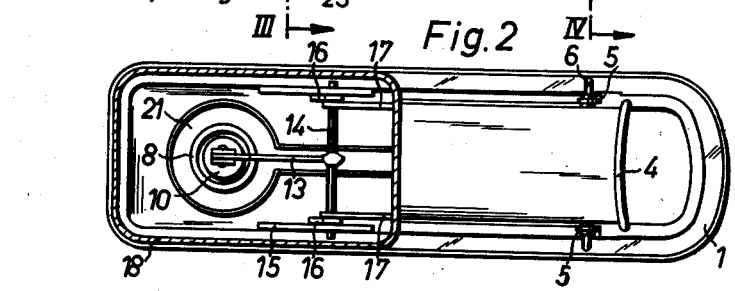
Figure 3:
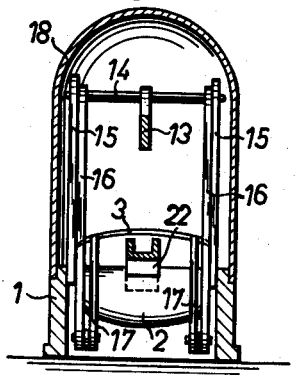
Figure 4:
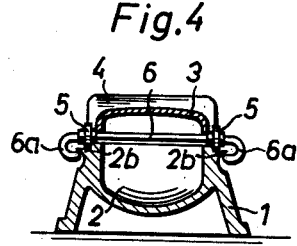

In order that the invention may be more clearly understood, reference will now be made to the accompanying drawings which show one embodiment thereof by way of example and in which:

FIGURE 1 shows a perpendicular longitudinal section through a transportable watering pump according to the invention,
FIGURE 2 shows a partial section and a partial plan view of the pump along the line II—II of FIGURE 1,
FIGURE 3 shows a cross section through the pump along the line III—III of FIGURE 1, and
FIGURE 4 shows a cross section along the line IV—IV of FIGURE 1.

Referring to the drawings, there is shown a transportable animal-actuated, watering pump according to the invention which consists of a base 1 of elongated form, one end of which is provided with a drinking trough 2, which extends in the longitudinal direction of the base. The trough and the base 1 may be cast or otherwise formed in one piece or the trough may be separate and secured in any desired manner in the base 1. A major portion of the trough 2 is covered by an elongated cap 3. A nose-engaging member 4 is provided at the free end of the cap 3, so that the animal may push thereagainst with its muzzle. The free end portion of the cap 3 is supported on the longitudinally extending spaced parallel upper side edges 2a of the trough 2, so that it may slide thereon advantageously by means of rollers 5, which rotate on a transverse spindle 6 extending through the cap 3. These rollers may have the stepped peripheral form shown in FIGURES 2 and 4, and their greater diameter portions may be disposed on the longitudinally extending upper edge of the base 1, the external flank of this step being laterally supported by flanges 2b, whereby the cap 3 is freely movable longitudinally but not transversely. The flanges 2b, which extend over the length of the trough 2, project laterally slightly beyond the base and therefore the bent ends 6a of the shaft 6, which is fixedly mounted in the cap 3, may engage in grooves beneath the flanges 2b, so that the cap cannot be lifted off or raised from the longitudinally extending upper edges 2a of the trough 2.

A pump is mounted on the end of the base 1 remote from the trough 2. A plunger pump is shown in the drawings, its suction side being provided with an inlet tube 7 to which a rigid or flexible water pipe or hose may be connected in any desired fashion. A base check valve shown at 9 is provided in the pump cylinder 8, and in the rest position, the pump piston 10 rests on this valve and thereby tightly seals it. The piston 10 is connected to a piston rod 11. The lower end of the piston 10 is provided with a cup leather for drawing water upwardly. The upper end of the piston rod 11 is pivotally connected at 12 to a lever arm 13, said lever arm being secured to a transverse shaft 14, which is mounted in lateral bearing members 15 which latter rest on the upper edge of the base 1 to which they are secured in any desired manner. If desired, the bearing members 15 may be formed as one single piece with the base 1 and the trough 2 e.g. by casting or in any other desired way. Two levers 16 are rigidly fixed to the external ends of the transverse shaft 14, said levers forming the operating member for the pump. The lower ends of the levers 16 extend as far as possible downwardly into the base 1, so that they are disposed in the vicinity of the lower edge of the base 1. The said lower ends of the levers 16 are pivotally connected to struts 17 at 23, which struts are in turn secured, for example by welding, to the end of the cap 3 remote from the butt plate 4. The struts 17 advantageously have inclined position as may be seen from FIGURE 1. The levers 16 are advantageously of arcuate shape and the upper pivoting shaft 14 therefor is arranged in such a manner that it is disposed approximately at the centre of the two extreme positions of the piston rod joint 12 in its movement. The whole piston rod and the pump are completely covered by a hood 18 which rests on and may be secured to a step of the base, e.g. by screws. The hood 18 is closed except for an opening 19 through which the cap 3 may slide forwardly into the hood 18 in the direction of the arrow 20 when the butt plate 4 moves forward. The struts 17 and the levers 16 are laterally separated by a distance such that they may swing past the pump cylinder 8. The operation is as follows:

It is assumed that there is water in the trough 2 at the free end thereof which is not covered, and the animal can see the water. The animal then tries to start drinking at that end and in so doing presses the butt plate 4 with its muzzle and the cap 3 is moved forward in the direction of the arrow 20, which starts the suction stroke of the pump, by means of the struts 17, the levers 16 and the lever arm 13. The water which is induced during the suction stroke flows over the upper edge of the cylinder 8 and is collected by an annular trough or collecting gulley 21 from which it flows off into the main trough 2 along a discharge channel 22.

When the butt plate is moved forward the pivotal or pressure point 23, of the operating member for the pump constituted by the levers 16 carries out an arcuate motion about the shaft 14 and the end of the cap 3 remote from the butt plate 4 carries out an equal and parallel arcuate motion, and therefore, with a forward travel, the forward end of the cap 3 is raised further away from the upper edge of the trough. It is possible by means of this arcuate motion of the forward part of the cap to pull the pump itself relatively near to the inner or forward end of the trough 2. Obviously, the hood opening 19 must extend sufficiently far in an upward direction in order to ensure that the upper edge thereof does not impede the movement of the cap. The end of the butt plate 4 of the cap 3 slides or rolls silently off the upper edge of the trough. When the forward travel is completed, the cap 3 rolls back into the initial position shown in FIGURE 1 as a result of the total weight of the parts, whereby the recuperator piston formed by piston rod 11, pumps water out of the cylinder 8 and over the upper edge thereof whence it flows into the trough, so that water is constantly present therein.

The pump according to the invention is adequately protected because all moving parts as well as most of the trough are completely covered, and it is possible to make the height of the covering hood 18 small by suitable arrangement of the points of application and bearing points of the pump rod. On the other hand, all movable parts are easily accessible merely by loosening the screws of the covering hood and lifting the hood.

I claim:

1. A watering pump comprising, a base member including an elongated watering trough portion and a base portion, pump means mounted on said base portion, said pump means having an inlet adapted for connection to a water supply and an outlet communicating with said trough portion, said pump means including an actuating lever reciprocatory displacement of which causes the pumping of water from said inlet to said outlet, a cap member longitudinally slidably mounted on said trough portion and connected to said lever, said cap member normally covering a major portion of said trough portion, displacement of said cap member for access to an increased portion of said trough portion actuating said pump means, and a cover member mounted on said base portion and enclosing said pump means, said cover member being apertured for movement of said cap member therethrough.

2. An animal-actuable watering pump comprising: a base member, a pump means mounted on said base member, means adapted to supply water to be pumped by said pump means, outlet means included in said pump means, a depending actuating lever pivotally supported by said base member from its upper end, said actuating lever being connected to said pump means to cause pumping operation thereof in response to reciprocatory displacements of the lower end of said actuating lever, elongated watering trough means included in said base member, said trough means having spaced upper edge portions extending perpendicularly to the pivotal axis of said actuating lever, water delivery means extending between said outlet means and said trough means, a protective cover member mounted on said base member and enclosing said pump means, and an elongated cap member extending freely longitudinally movably through said cover member, one end portion of said cap member being connected to be supported by and to displace the lower end of said actuating lever, the other end portion being slidably supported by said upper edge portions of said trough means, said cap member being provided with a nose-engaging member at said other end portion, said cap member normally covering the major portion of said trough means, pump actuating displacement of said cap means being produced by the animal in gaining access to water located in said trough by engagement with said nose-engaging member to uncover the normally covered portion of said trough means.

References Cited in the file of this patent

UNITED STATES PATENTS

| | | |
|---|---|---|
| 735,918 | Tiffany | Aug. 11, 1903 |
| 933,635 | Durr | Sept. 7, 1909 |
| 2,585,547 | Harmon | Feb. 12, 1952 |
| 2,702,527 | Miele | Feb. 22, 1955 |
| 2,891,509 | Baschant | June 23, 1959 |